May 27, 1969  M. G. HARWOOD ET AL  3,446,187
PECKING SHIELD FOR POULTRY
Filed Sept. 26, 1967

INVENTORS:
MILTON G. HARWOOD
LOUIS J. HARWOOD
BY
ATTORNEY

United States Patent Office 3,446,187
Patented May 27, 1969

3,446,187
PECKING SHIELD FOR POULTRY
Milton G. Harwood and Louis J. Harwood, both c/o
P.O. Box 38, Farmingdale, N.J. 07727
Filed Sept. 26, 1967, Ser. No. 670,583
Int. Cl. A01k 39/00
U.S. Cl. 119—97          3 Claims

ABSTRACT OF THE DISCLOSURE

A pecking shield for poultry having a beak covering portion terminating in a dull rounded tip for projecting beyond the beak of poultry provided with a mouth bit, and securing means for locking the poultry shield to the upper beak, to prevent pecking injury to other poultry.

---

This invention relates to a shield for attachment to to the beaks of poultry, and more particularly to a covering shield readily attached to the upper beak of poultry to prevent pecking damage to other birds.

This application is an improvement of application Ser. No. 646,141 filed May 26, 1967.

Poultry confined to a cage, readily establishes a pecking order and territorial rights which sometimes results in injury to and loss of a substantial portion of the flock, with a consequent reduction in egg laying capacity, of economic importance to poultry farmers.

Various types of anti-pecking devices have been devised to block poultry vision. Some devices permit full vision but provide a gravity controlled shield to blunt the pecking blow.

In our earlier application we found that we could control the position of the pecking shield by placing it in the mouth of the bird and between the upper and lower beak members. In our present application we have devised a stronger and simpler device for this purpose.

Accordingly, the objects of our invention are to provide a shield in a position to continuously blunt the pecking blow and thereby reduce the pecking damage to the birds with a beak covering shield terminating in a dull tip, that is provided with a bit positioned in the mouth of the bird, and which does not open the bird's mouth unduly.

Following our earlier application we also seek to provide a shield that is held captive in postion in the mouth of the bird by securing means positioned in its nostrils; to provide a shield that can also be applied to a bird whose beak has been partially removed; to provide a shield that cannot be dislocated by the poultry; that will not catch on the wire screen used to contain poultry; which will not interfere with the drinking and eating habits of the bird; a device which is easy to apply, and which when positioned will not disturb the bird so as to cause injury to itself, nor interfere with normal egg production.

We accomplish these and other objects and obtain our new results as will be apparent from the shield described in the following specification, particularly pointed out in the claims and illustrated in the accompanying drawing which:

Figure 1:
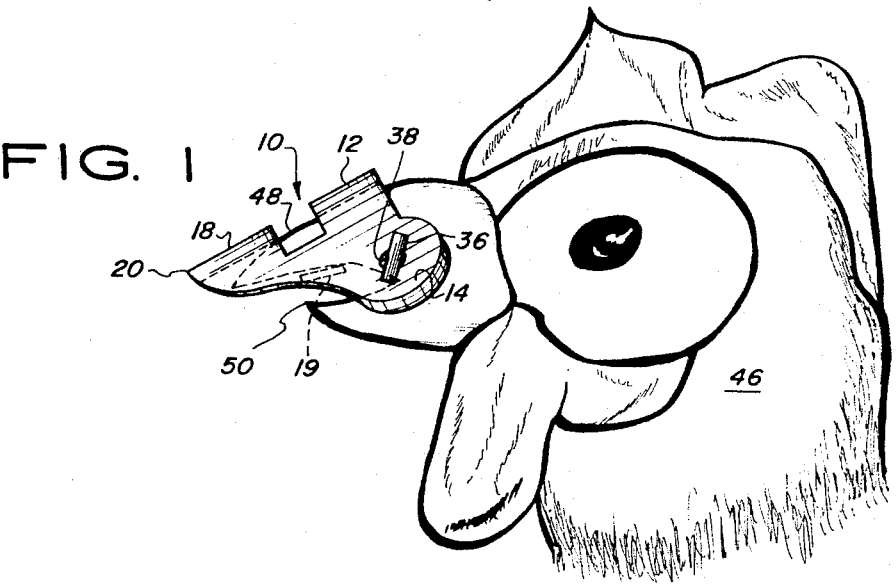
FIG. 1 is a side elevation of the shield installed on the beak of poultry.
Figure 2:
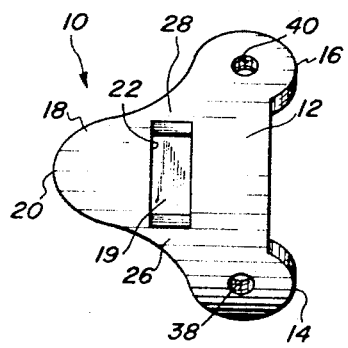
FIG. 2 is a top plan view of the shield itself.
Figure 3:
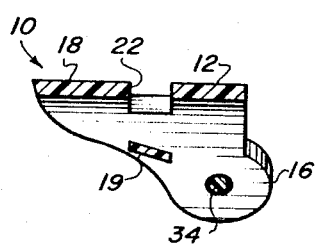
FIG. 3 is a longitudinal cross-sectional view of the shield.
Figure 4:
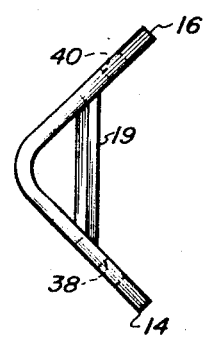
FIG. 4 is an end view.

Generally the invention comprises a dull pointed V shaped covering shield having a mouth bit engaging the two free edges of the V-shaped shield, the upper beak of poultry being thrust between the mouth bit and the cover shield, and a fastener for locking the shield to the beak.

Referring in greater detail to the construction, the poultry shield 10, comprises the body 12, from which extend two ear sections 14 and 16, and a shield portion 18. The shield portion terminates in a rounded and dull shield tip 20. A slot 22 is formed between the body 12 and shield portion 18, for enabling the mouth bit 19 to be formed as will be hereinafter explained. The shield portion 18 remains joined to the body 12 by connecting portions 26 and 28.

Figure 5:
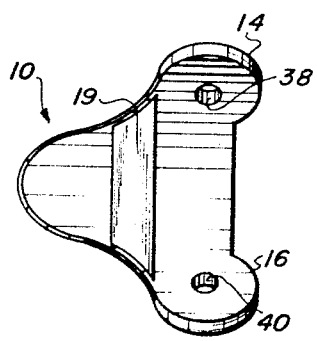
FIG. 5 is a bottom view of the shield.
Figure 6:
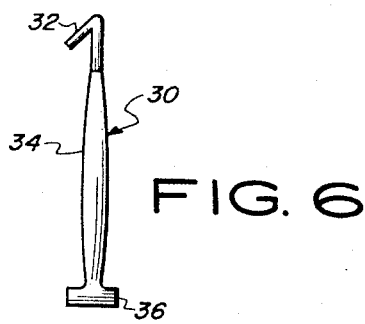
FIG. 6 is a side elevation of the fastener used to secure the shield through the nostrils of poultry.

The poultry shield is preferably mounted to the poultry by a fastener 30, shown in detail in FIG. 5. Such a fastener 30, shown in detail in FIG. 5. Such a fastener is described in greater detail in Patent No. 3,212,475. It is preferably made of nylon with a pointed self-locking tip 32, a stiff central portion 34 and a head section 36.

The pointed tip 32 of the fastener is inserted in an aperture 38 of the ear section 14, then through the nostrils of the poultry, finally passing through the aperture 40 of ear section 16, the barb 32 opening to self-lock the shield and fastener in position on the poultry beak.

The molding of the shield is facilitated by the slot 22 in that the upper portion of the mouth bit 19 is formed by the upper mold portion (not shown) while the sides and bottom of the bit 19 are formed by the lower mold part, also not shown. Thus the mouth bit 19 may be molded integrally to the covering shield without difficulty.

The shield conforms substantially to the V-shaped contour of the upper beak, and extends sufficiently beyond the beak tip, when worn to blunt the peck of the bird and thus prevent damage between birds. If the shield is made of metal, the tip may be turned at right angles to the direction of the peak to prevent the edge from cutting.

In assembling the poultry shield 10 to the head of poultry the upper and lower beaks 48 and 50 are opened and the poultry shield with the fastener inserted through aperture 38, is mounted over the upper beak 48 and secured thereto by inserting the upper beak between the shield body 12, and the mouth bit 19. The bit keeps the shield from pivoting on the fastener during use. The pointed tip of the fastener is then inserted through both bird's nostrils and shield aperture 40, locking the shield in position.

The device illustrated is preferably made of flexible plastic, such as polyethylene. However, the poultry shield may be made of metal, and in sheet form, curved to provide the body 12 as it fits around and below the upper beak 48 as is shown in FIG. 1. The mouth bit 19 may be made thin so as not to open the mouth unduly when installed, since the pecking blow is now carried by the thicker cover shield.

The shield does not interfere with the drinking and eating habits of the poultry, and is not disturbing to the birds so as to lower egg production. The birds may continue to engage in their normal activities. However, the pecking damage is now prevented from occurring.

We have thus described our invention, but we desire it understood that it is not confined to the particular form shown and described, the same being merely illustrative, and that the invention may be carried out in other ways without departing from the spirit of our invention, by means of which objects of our invention are obtained and new results accomplished since the particular embodiment herein shown and described is only one of the many that can be employed to obtain these objects and accomplish these results.

We claim:
1. A one piece, nonmovable pecking shield for mount- ing to the upper beak of poultry, which comprises a shield member extending over the upper surface of the upper beak and having a dull tip portion projecting beyond the edge of the beak to diffuse the force of a pecking blow of the poultry, a portion of the shield defining a mouth bit connecting the two sides of the shield member for positioning in the mouth of poultry, and means for securing the extending shield to the beak of poultry so as to prevent dislocation of the shield on the beak of the poultry.

2. The pecking shield of claim 1 wherein the upper surface of the shield is provided with an opening directly above the mouth bit.

3. The method of forming the mouth bit on the pecking shield of claim 1 which comprises forming an opening in the pecking shield for shaping the upper surface of the mouth bit.

References Cited

UNITED STATES PATENTS

| | | | |
|---|---|---|---|
| D. 129,580 | 9/1941 | Eisen | 119—97 X |
| 2,018,796 | 10/1935 | Layton | 119—97 |
| 2,154,105 | 4/1939 | Nadler | 119—97 |
| 2,286,001 | 6/1942 | Nichols et al. | 119—97 |
| 2,287,190 | 6/1942 | Mitchell | 119—97 |
| 3,254,628 | 6/1966 | Jones | 119—97 |

ALDRICH F. MEDBERY, *Primary Examiner.*